J. D. Merriam.
Folding Chair.

No. 3,986.

Reissued May 17, 1870.

Witnesses;
J. H. Piper
L. E. Piper

Inventor;
J. D. Merriam

N. PETERS, PHOTO-LITHOGRAPHER, WASHINGTON, D. C.

United States Patent Office.

EDWARD W. VAILL, OF WORCESTER, MASSACHUSETTS, ASSIGNEE OF JOSEPH D. MERRIAM.

*Letters Patent No.* 37,324, *dated January* 6, 1863; *reissue No.* 3,986, *dated May* 17, 1870.

IMPROVED FOLDING CHAIR.

The Schedule referred to in these Letters Patent and making part of the same.

*To all whom it may concern:*

Be it known that JOSEPH D. MERRIAM, of Ashburnham, in the county of Worcester and State of Massachusetts, did invent a new and improved Folding Chair; and I do hereby declare the following to be a full and exact description of the same, reference being had to the accompanying drawings making part of this specification, in which—

Similar letters of reference indicate corresponding parts in the two figures.

Figure 1:
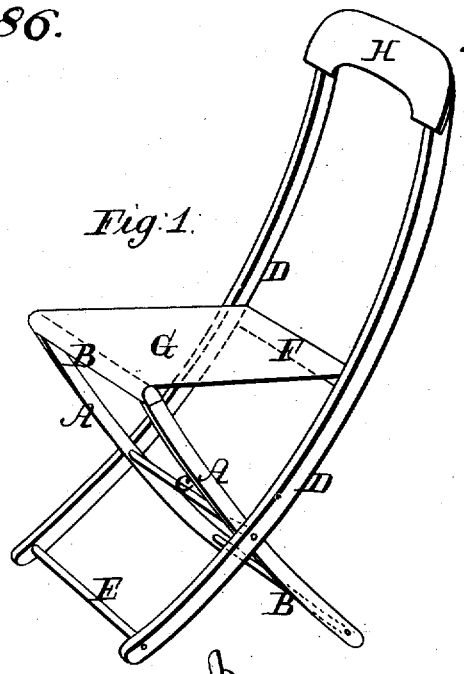
Figure 1 is a perspective view of the improved chair, unfolded or adapted for use.
Figure 2:
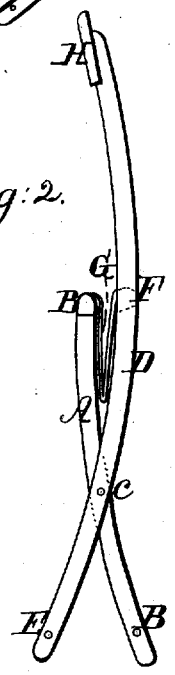
Figure 2 is a side view of the same, folded.

The object of this invention is to obtain a light, portable, and inexpensive chair, which is capable of being folded into a compact and convenient form for handling and for transportation, and which is equally well adapted for use in the house, lecture-room, or camp; and It consists in two pairs of legs, held together by means of rounds or cross-bars, and provided with a back piece and a flexible seat, all as will be hereinafter fully explained.

To enable others skilled in the art to fully understand and construct this invention, I will proceed to describe it.

A A represent the back legs and D D the front legs, which are made of wood, and connected together by a pivot-bar, *c*.

The back legs A A are, also, connected together at their upper and lower ends, by bars or rounds, B B, having tenons formed on their outer ends, fitting mortises in the legs A A.

The legs D D extend above the seat, and, with the piece H, form the back of the chair.

Between the back piece H and round E of the pieces D D, is a bar or round, F, to which a piece of canvas, carpeting, or other flexible material is attached at one edge by tacks or small screws. The opposite edge of the canvas or carpeting is attached, in a similar manner, to the cross-bar or round B, and forms, when the legs are spread apart, a yielding seat or bottom to the chair.

A chair constructed in the manner above described, makes an extremely simple, cheap, and durable article of furniture.

Having fully described this invention,

What is claimed as new, and desired to be secured by Letters Patent, is—

A folding chair, composed of pieces A A and D D, connected together by means of rounds or cross-bars, back piece H, and pivot-bar C, and provided with a flexible seat, G, substantially as described.

The above specification signed this 5th day of May, A. D. 1870.

E. W. VAILL.

Witnesses:
D. OURAND,
CHAS. A. PETTIT.